United States Patent [19]

Millnitz

[11] 4,080,929

[45] Mar. 28, 1978

[54] METHOD AND APPARATUS FOR BROODING FISH

[76] Inventor: Ronald W. Millnitz, Box 403, Culver City, Calif. 90230

[21] Appl. No.: 720,609

[22] Filed: Sep. 7, 1976

[51] Int. Cl.² .............................................. A01K 61/00
[52] U.S. Cl. ......................................................... 119/3
[58] Field of Search ........................................ 119/3, 5

[56] References Cited

U.S. PATENT DOCUMENTS

| 173,262 | 2/1876 | Brackett | 119/3 |
| 263,933 | 9/1882 | McDonald | 119/3 |
| 680,838 | 8/1901 | Bourgeois | 119/3 |

Primary Examiner—Hugh R. Chamblee
Attorney, Agent, or Firm—Lyon & Lyon

[57] ABSTRACT

Both a method and apparatus are disclosed for incubating fish eggs. The incubator is specifically suited for eggs normally incubated by mouthbrooding. However, other brooding forms are equally well attended. The apparatus includes a cylindrical, screened container rotatably mounted about a horizontal axis and driven by a paddle wheel. The entire apparatus is sunk into a fish tank and air is supplied beneath the paddle wheel for continuous slow-speed rotation of the cylindrical container. The eggs are positioned within the container and allowed to slowly move by gravity as the container is rotated.

14 Claims, 3 Drawing Figures

METHOD AND APPARATUS FOR BROODING FISH

BACKGROUND OF THE INVENTION

The present invention is directed to both method and apparatus for brooding fish. The present invention has specific application for mouthbrooding fish.

Fish employ a variety of methods for brooding their young. Such methods include, in a first extreme, simply scattering eggs on the bottom and leaving them never to return. The mouthbrooder species are at the other extreme in that these fish carry their eggs and hatched young around in their mouths. In the case of the female mouthbrooder, the eggs are laid in a convenient location and subsequently fertilized by the male. Following fertilization, the eggs are gathered into the buccal cavity for incubation. This incubation period may last a matter of a few weeks or as long as two months. During this time, the female does not eat. Once the eggs hatch, the young remain in the mother's buccal cavity until their yolk sacs are exhausted. During this period of infancy, the young fish do leave the mother's mouth for short periods which in some instances allows the mother to eat.

Obviously there are some disadvantages associated with this natural procedure. First, the female's inability to eat during the brooding period will cause her to lose substantial weight and not infrequently results in actual starvation. Furthermore, during this period, the female will not breed. Thus, the next brooding period is delayed. It has also been found that other fish will ram the brooding female causing eggs to be ejected from her buccal cavity. The ramming fish then quickly eat the expelled eggs. It is believed that the fish lay far more eggs than they are able to successfully breed and that many of the eggs are swallowed or expelled. It can be seen that many perils exist for both the female and the eggs under this natural method of brooding.

It has been found difficult to artifically brood the eggs of a mouthbrooding fish because the mouthbrooding technique provides many advantages along with the foregoing disadvantages. The eggs of a mouthbrooder require continual turning because the yolk of each egg would otherwise settle to the bottom. Such settling of the yolk results in the death of the embryo. The mouthbrooder female continually tumbles the eggs within her mouth to prevent this phenomenon. This tumbling action also keeps the eggs clean and prevents an infestation of bacteria. Mere containment within the mouth of the female also provides protection against bottom scavenging fish and other animals. Finally, the eggs may be kept in the proper temperature environment which the female naturally seeks.

Thus, the brooding process employed by mouthbrooding fish provides a number of both advantages and disadvantages for maximizing fish production. Some of the perils referred to above are also true for eggs of both egg layers and egg scatterers. Scavenging predators, bacterial infestation and external damage account for substantial losses of fish eggs in all varieties of fish brooding techniques.

SUMMARY OF THE INVENTION

The present invention is directed to both an apparatus and a method for brooding fish eggs. The eggs of mouthbrooders, egg layers and egg scatterers may all be incubated by means of the present invention. The present invention provides the advantages of the natural methods while eliminating or substantially reducing the detriments of such natural methods of fish brooding.

A rotating cylindrical container is employed submerged in a controlled water environment. The eggs are placed within the rotating container which allows the controlled water environment to flow therethrough. Slow rotation of the container causes the eggs to move continuoutsly during the incubation period. By means of this apparatus and method, the eggs are continually rotated to prevent the yolks from settling to the bottom and to keep the eggs clean. This cleaning effect of the continual rotation prevents bacterial infestation on the eggs. The eggs are also separated by means of the container from the other fish and animals which may be kept within the breeding aquarium. At the same time, the female fish are unhampered by eggs otherwise kept within their buccal cavity or over which they are required to stand guard. Thus, the advantages of the natural processes employed by fish to brood eggs are retained by the present invention while a number of disadvantages are overcome.

Accordingly, it is an object of the present invention to provide a brooding apparatus and method for fish.

It is another object of the present invention to provide apparatus and method for brooding eggs and young of mouthbrooding fish.

Other and further objects and advantages will appear hereinafter.

DETAILED DESCRIPTION OF THE PREFERRED EMBODIMENT

Figure 1:
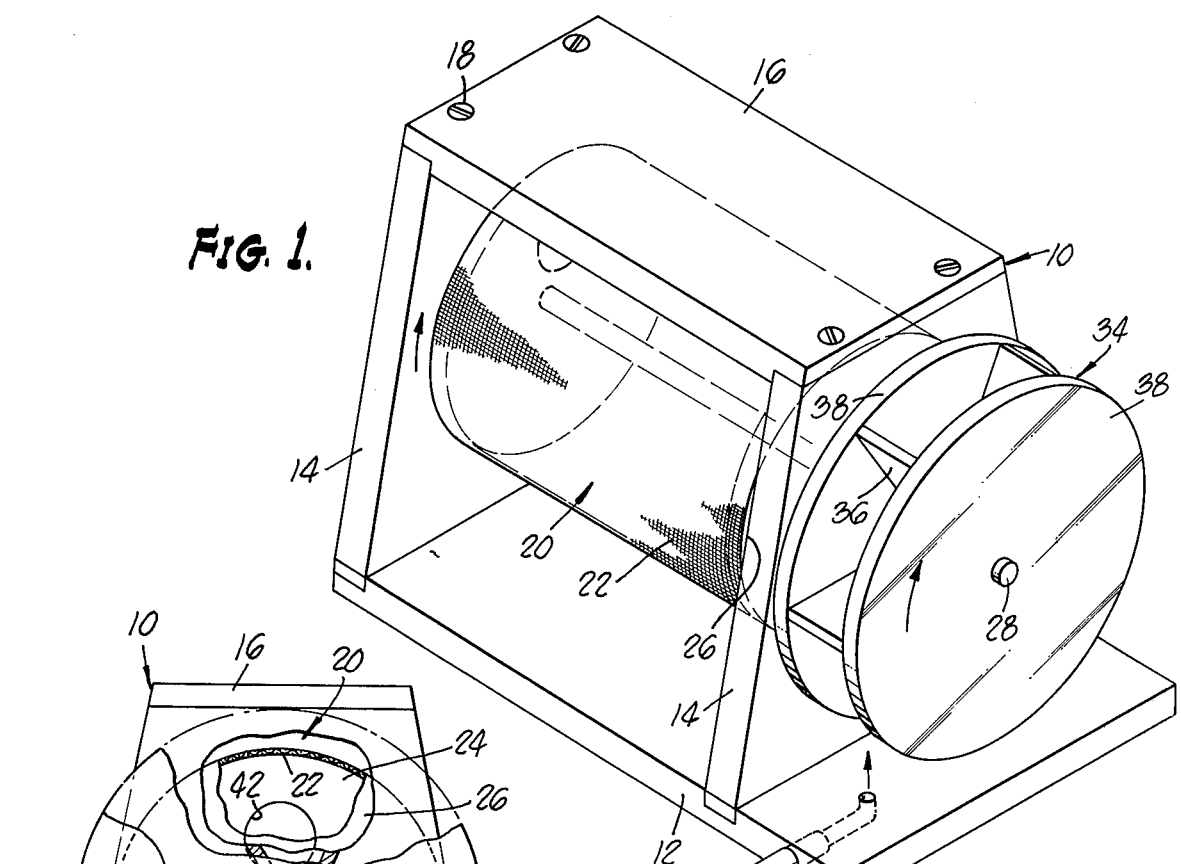
FIG. 1 is a perspective view of the present invention.

Turning in detail to the drawing, the Figures illustrate the preferred embodiment in its assembled configuration. The brooder is designed to be placed within a fish aquarium which may also contain the mother or within a separate tank maintaining a similar water environment. The brooder itself includes a base structure, generally designated 10. The base structure 10 has a first mounting plate 12, vertical members 14 and a top plate 16. It has been found that one-half inch plexiglass sheet may be advantageously used for the construction of this base structure 10. The plexiglass is heavier than water and will cause the entire brooding assembly to assume a stable position under water in an aquarium. Furthermore, the plexiglass is clear and provides clear viewing of the eggs or fry contained within the device. The plexiglass is also easily assembled through the use of stainless steel screws 18.

Between the vertical members 14, a container 20 is rotatably mounted. The container is substantially circular in cross section, the circular well being defined by a screen 22. The screen 22 is plastic to prevent corrosion and disadvantageous chemical reactions. The mesh size of the screen must be selected to prevent the eggs and the hatching fry from passing therethrough or becoming lodged therein. At the same time, water should be able to flow through the screen without much difficulty. In selecting a screen 22, the screen should have relatively large openings, which openings are not so large as to allow the eggs or fry to pass through, in order that the eggs and fry may be readily observed through the screen.

The container 22 is most conveniently in the form of a cylinder having circular end plates 24 and 26 about which the screen 22 is wrapped. This resulting container 20 may be conveniently held by means of silicone rubber. Large loads are not normally applied to the container 20 and the silicone rubber lessens any possibility of damaging impact between the container 20 and the eggs positioned therein.

Positioned along the symmetrical center line of the cylindrical container 20 is a mounting shaft 28. It has been found that a stainless steel shaft is advantageous for the present application as corrosion is reduced or eliminated while relatively free rotation is allowed between the shaft 28 and the base structure 10. The mounting shaft 28 is press fit or otherwise associated with both end plates 24 and 26 to transmit the rotation of the shaft 28 to the container 20. The shaft 28 also extends through both vertical members 14 such that the container becomes rotatably mounted relative to the base structure 10. Spacers 30 and 32 are positioned on either side of the vertical members 14 on the mounting shaft 28 to maintain the axial location of the container 20. The spacer 30 at the free end of the shaft 28 is preferably press fit or otherwise snuggly associated with the mounting shaft 28 to prevent axial migration of the shaft 28 in the base structure 10.

Figure 2:
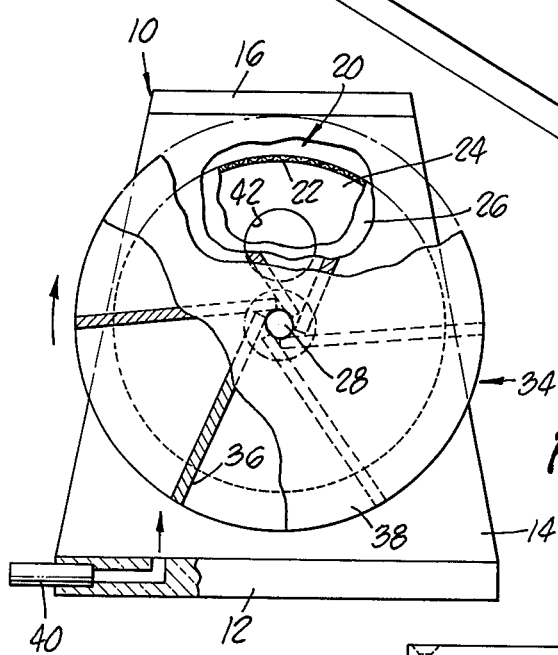
FIG. 2 is an end view of the present invention having a plurality of portions broken away for clarity and illustration.
Figure 3:
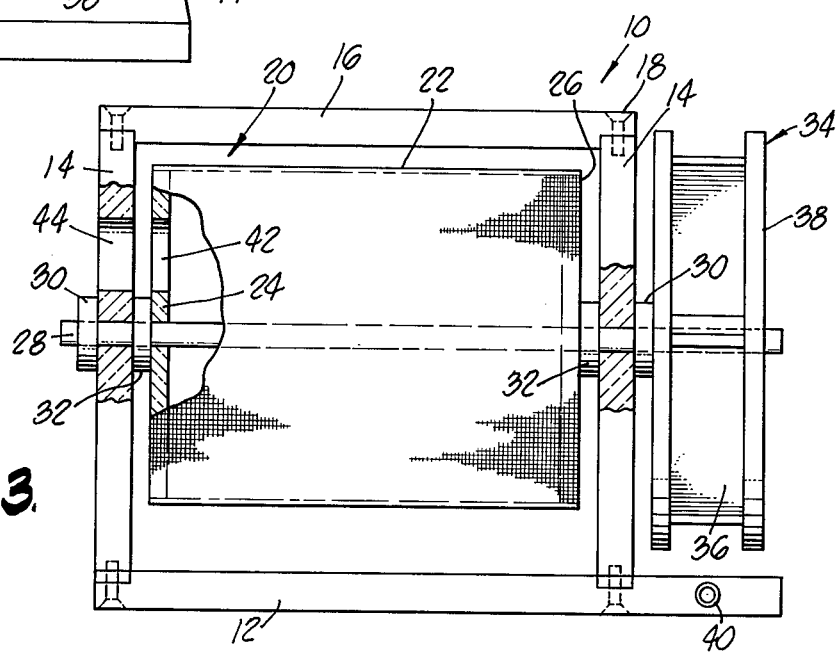
FIG. 3 is a front elevation of the present invention also having portions broken away for clarity.

Drive means are to be provided for rotating the container 20. In the present embodiment, a simple, yet effective means is disclosed which includes a wheel 34 driven by air from a convential aquarium aerator. Air driven paddle wheels are known for use as decorative features in aquariums. However, more power is required to drive the incubator than is required for such decorative devices. Consequently, a wheel has been devised, as can best be seen in FIG. 2, which provides increased torque over a system employing exactly radial paddles. The paddles 36 extend outwardly to the rim of the wheel 34 from a position tangential to the shaft 28. As a result, air is not released as early from each succeeding paddle 36 as the wheel 34 rotates. Chambers between the paddles 36 are thus provided which may be employed to entrap air. A source of air from a conventional aquarium aerator is pumped conveniently through the mounting plate 12 in passageway 40, to an outlet below the wheel 34 and displaced laterally from the axis of the wheel 34. Air is pumped into each succeeding cavity provided between the paddles 36 until the buoyancy created causes rotation of the wheel 34 and container 20. In rotating to release the entrapped air, a new cavity is presented above the outlet of the passageway 40 to again entrap air. This rotation is continued continuously as long as a supply of air is provided.

Access to the container 20 is provided through a hole 42 in one end plate 24. The hole 42 is spaced from the screen 22 to prevent accidental passage of eggs therethrough. A corresponding hole 44 extends through the adjacent vertical member 14 of the base structure 10. As the hole 44 in the vertical member 14 is stationary while the hole 42 rotates, a direct passageway from the entire brooder is provided only infrequently. Consequently, there is no need for covering either hole 42 or 44. However, if such a need were found to exist, a conventional plug could be provided.

To employ the brooder of the present invention, the eggs are gathered to be placed in the container 20. In the case of the mouthbrooder, the female is captured and picked up in the hand. The fish is then oriented under water with her head down above a net. The fish's jaws are then opened by pressure on either side of the jaws adjacent the back of the mouth. Once the fish's mouth has been opened involuntarily, the fish is pulled backward through the water. This action causes water to flow through the gills of the fish and flush the eggs from the buccal cavity into the net. This process is continued until all of the eggs are flushed from the fish's mouth.

The eggs contained within the net are then placed in a small container along with water from the aquarium where the mother is kept. The brooder is positioned within the aquarium on its end such that the holes 42 and 44 are aligned and facing upwardly. A funnel may be placed in the holes 42 and 44 and the eggs transferred from the small container into the brooder container 20. The brooder is then righted and an air line is attached to the passageway 40. The flow of air is monitored and adjusted such that the container 20 rotates at about one revolution every two minutes. Artificial brooding is thus initiated.

In the container 20, the eggs will slowly roll down the screen 22 as the container 22 rotates. This action prevents settling of the yolk and the accumulation of dirt. Furthermore, the container prevents other fish from getting at the eggs or young fry. It has been found that eggs and young fry of different species of fish may be incubated simultaneously as the young fry do not prey on one another or the eggs during their early stages.

Thus, a method and apparatus for artificially brooding fish is provided by the present invention. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A fish brooder comprising
 a base;
 a container, said container having passageways through a first wall thereof to permit flow of water into and out of said container and being sufficiently small to prevent passage of incubated fish therethrough;
 means to rotatably mounting said container to said base about a substantially horizontal axis, said container being substantially circular in cross section taken through a plane normal to the substantially horizontal axis of rotation; and
 drive means for rotating said container.

2. The fish brooder of claim 1 wherein said first wall is a screen.

3. The fish brooder of claim 1, wherein said brooder is immersed in water during brooding.

4. The fish brooder of claim 1 wherein said container is cylindrical having two end walls and a cylindrical wall, said cylindrical wall being said first wall.

5. The fish brooder of claim 4 further including a hole through one of said end walls spaced from said cylindrical wall through which access is provided to said container.

6. The fish brooder of claim 4 wherein said cylindrical wall is a screen.

7. The fish brooder of claim 6 wherein said screen is plastic.

8. The fish brooder of claim 1 wherein said drive means includes a paddle wheel fixed to rotate with said container and a pressurized air inlet below said paddle wheel.

9. The fish brooder of claim 8 wherein said paddle wheel includes paddles extend tangentially adjacent the hub of said paddle wheel.

10. A method for brooding fish, including the steps of positioning fish eggs in a non-watertight container; placing the container in a tank of water having a controlled environment; continuously rotating the container at a low rate of speed.

11. The method of claim 10 wherein said step of continuously rotating the container is at a rate of around one revolution every two minutes.

12. The method of claim 10 wherein said tank of water has an environment identical to that of the mother fish.

13. The method of claim 10 wherein the step of continuously rotating the container is by means of air from an aerator.

14. The method of claim 10 wherein the eggs to be incubated are that of a mouthbrooder.

* * * * *